(12) United States Patent
Holt, Jr.

(10) Patent No.: US 9,301,499 B2
(45) Date of Patent: Apr. 5, 2016

(54) PET DESHEDDING TOOL

(71) Applicant: Coastal Pet Products, Inc., Alliance, OH (US)

(72) Inventor: Robert C. Holt, Jr., North Canton, OH (US)

(73) Assignee: Coastal Pet Products, Inc., Alliance, OH (US)

( * ) Notice: Subject to any disclaimer, the term of this patent is extended or adjusted under 35 U.S.C. 154(b) by 116 days.

(21) Appl. No.: 13/777,557

(22) Filed: Feb. 26, 2013

(65) Prior Publication Data

US 2014/0238310 A1    Aug. 28, 2014

(51) Int. Cl.
*A01K 13/00*    (2006.01)

(52) U.S. Cl.
CPC .................................. *A01K 13/002* (2013.01)

(58) Field of Classification Search
CPC ... A01K 13/00; A01K 13/002; A22C 25/025; A47L 13/08; A46B 17/04
USPC ......... 119/600, 618, 619, 620, 625, 630, 631, 119/632, 633; 132/152, 111, 116, 153; 15/142, 236.06, 236.08
IPC . A01K 13/00; A22C 25/02; A47L 13/08; A46B 17/04
See application file for complete search history.

(56) References Cited

U.S. PATENT DOCUMENTS

| | | | | | |
|---|---|---|---|---|---|
| 1,516,990 | A | * | 11/1924 | Silverman | 132/150 |
| 3,160,142 | A | * | 12/1964 | Torow | 119/623 |
| 3,981,275 | A | * | 9/1976 | Schimoler | 119/610 |
| 4,970,990 | A | * | 11/1990 | Wilhelmi | A01K 13/002 119/601 |
| 5,533,894 | A | * | 7/1996 | Capps | 433/1 |
| 6,199,513 | B1 | * | 3/2001 | Nichols | A01K 13/002 119/625 |
| 7,458,163 | B2 | * | 12/2008 | Teich et al. | 30/425 |
| 7,748,350 | B2 | * | 7/2010 | Vandervoet | 119/618 |
| 7,918,029 | B2 | * | 4/2011 | Melton et al. | 30/233.5 |
| 8,720,381 | B2 | * | 5/2014 | Wang | 119/611 |
| 2012/0304938 | A1 | * | 12/2012 | Wang | 119/618 |
| 2013/0125829 | A1 | * | 5/2013 | Wang | 119/611 |
| 2014/0026821 | A1 | * | 1/2014 | Tu | 119/600 |

* cited by examiner

*Primary Examiner* — Lisa Tsang
(74) *Attorney, Agent, or Firm* — Renner, Kenner, Greive, Bobak, Taylor & Weber

(57) ABSTRACT

A deshedding tool (10) for removing hair from a pet includes a handle (13) which carries a blade holder (14). A blade assembly (20) is carried by the blade holder (14). The blade assembly (20) includes a plurality of sawtooth blade segments (21) and a plurality of blade guards (22). The blade segments (21) and the blade guards (22) alternate with each other, and the blade guards extend outwardly from the blade holder (14) and downwardly from the blade holder (14) farther than the blade segments (21).

20 Claims, 3 Drawing Sheets

PET DESHEDDING TOOL

TECHNICAL FIELD

This invention relates to a deshedding tool for a pet. More particularly, this invention relates to such a tool which will remove loose hair from a pet without irritation or damage to the skin of the pet.

BACKGROUND ART

There are a wide variety of tools, sometimes known as rakes, for deshedding pets available on the market. The primary purpose of such tools is to remove loose hair from the pet without pulling out hair that is not loose. One approach to the problem are the pet tools which include a sawtooth-like blade which engage and remove the loose hair from the pet. However, such devices can not only injure the user, but also they often damage or irritate the skin of the pet if the user does not use extreme care when utilizing the tool.

Thus, the need exists for a pet tool that effectively removes loose hair from the pet without damage or irritation to the skin of the pet.

DISCLOSURE OF THE INVENTION

It is thus an object of one aspect of the present invention to provide a pet tool which removes loose hair from the pet without irritation to the skin of the pet.

It is an object of another aspect of the present invention to provide a pet tool, as above, which is conveniently used without potential damage to the user.

These and other objects of the present invention, as well as the advantages thereof over existing prior art forms, which will become apparent from the description to follow, are accomplished by the improvements hereinafter described and claimed.

In general, an apparatus for removing loose hair from an animal made in accordance with one aspect of the present invention includes a handle and a blade holder carried by the handle. A blade assembly is carried by the blade holder and it includes a plurality of blade segments and a plurality of blade guards. The blade segments and blade guards alternate with each other to form the blade assembly.

In accordance with another aspect of the invention, an apparatus for removing loose hair from an animal includes a handle and a blade holder carried by the handle. A blade assembly is carried by the blade holder and it includes a sawtooth blade portion and blade guards spaced along the blade portion.

A preferred exemplary pet deshedding tool according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
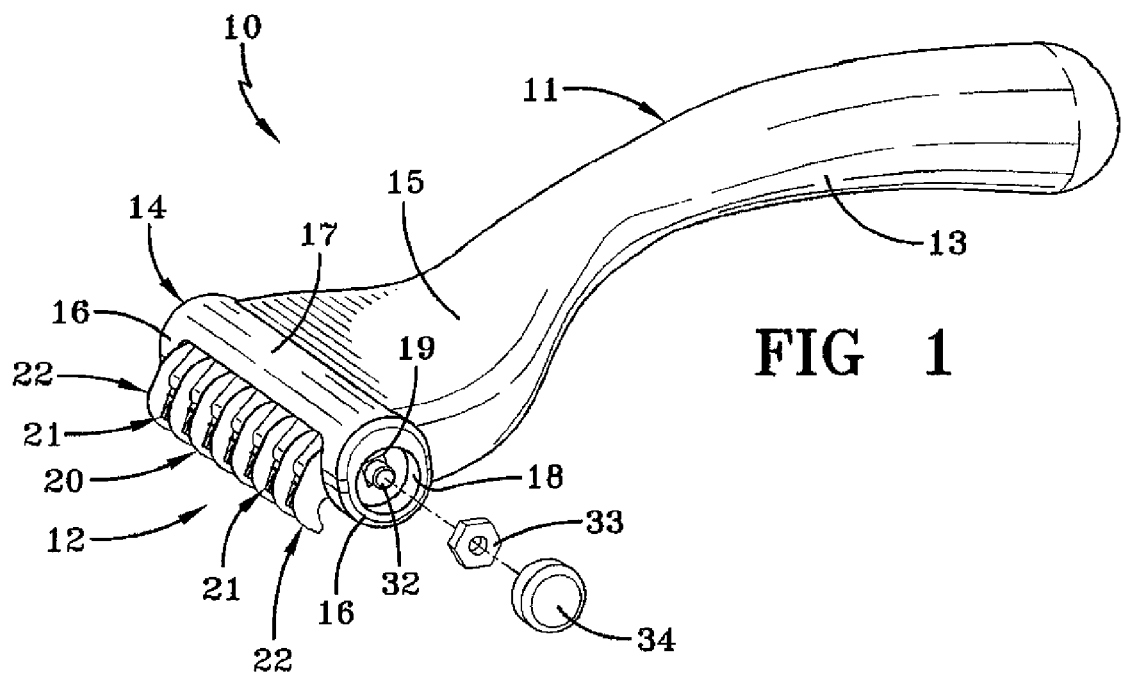
FIG. 1 is a top perspective view of a pet deshedding tool made in accordance with the concept of the present invention.
Figure 2:
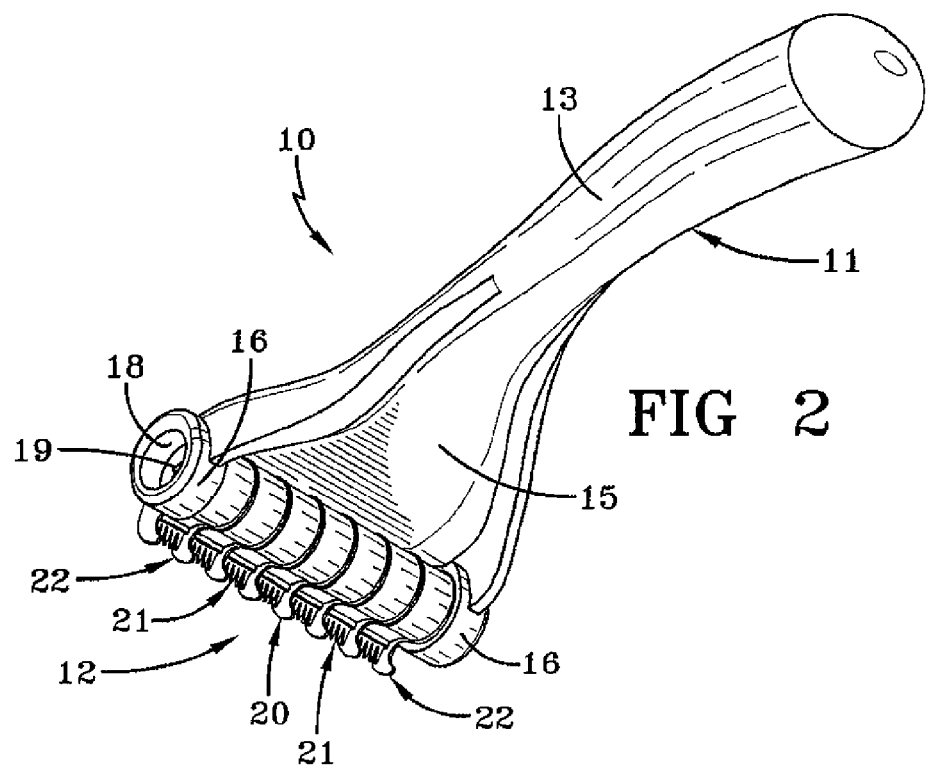
FIG. 2 is a bottom perspective view thereof.
Figure 3:
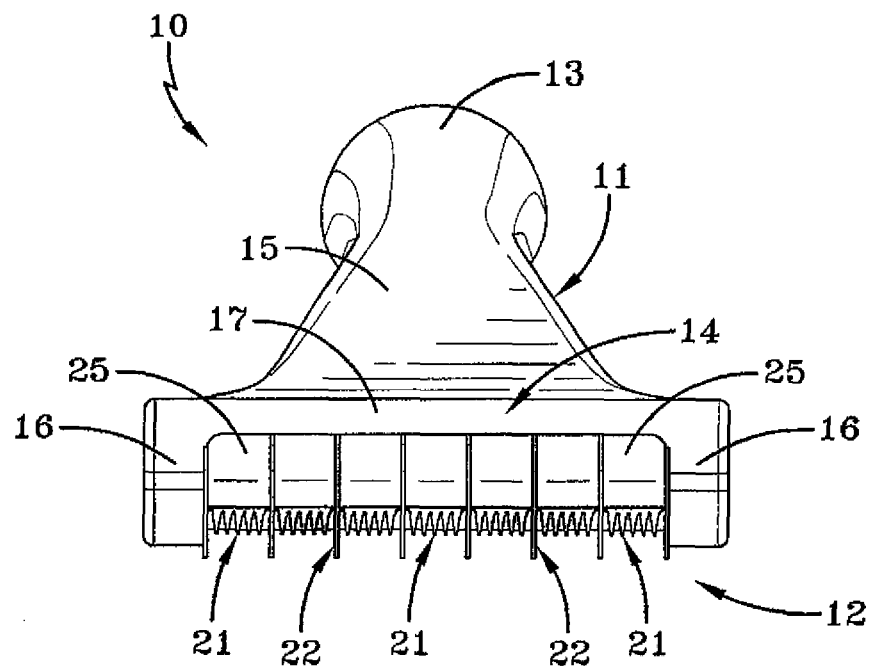
FIG. 3 is a front elevational view thereof.
Figure 4:
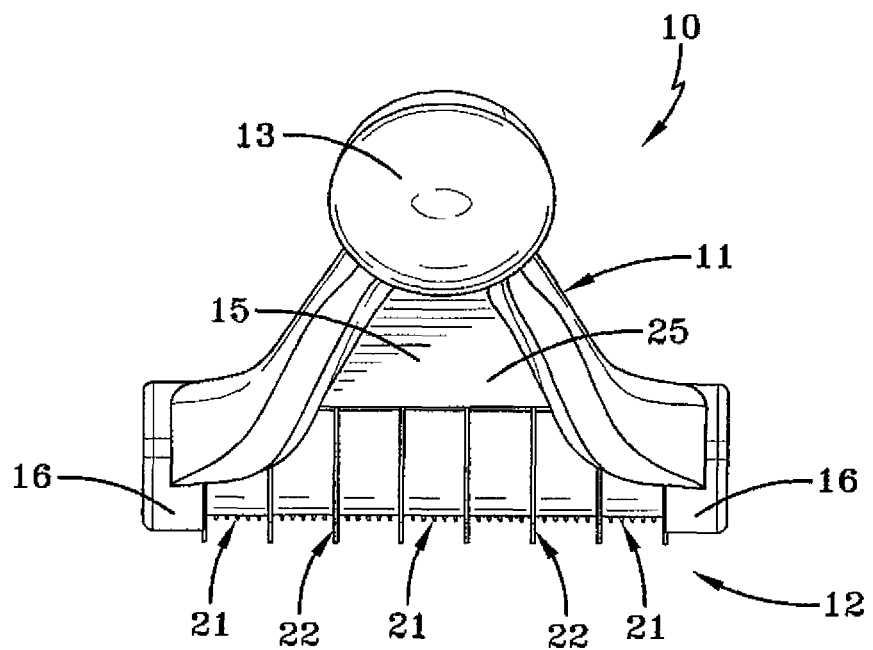
FIG. 4 is a rear elevational view thereof.

A pet deshedding tool made in accordance with the present invention is indicated generally by the numeral 10. Tool 10 includes a handle portion, generally indicated by the numeral 11, and a rake portion generally indicated by the numeral 12.

Handle portion 11 is preferably made of a rigid plastic material and includes a handle 13 and a blade holder 14 with a transition portion 15 between handle 13 and blade holder 14. In use, the fingers of the user can grasp handle 13 and the thumb of a user can be received on top of transition portion 15. As such, for comfort, the top of transition portion 15, and also at least the sides of handle 13 can be formed with a softer plastic material.

Blade holder 14 includes circular end portions 16 interconnected by an arcuate top surface 17. End portions 16 have a circular open end 18 exposing a non-circular, preferably square or hex, opening 19 formed through the end portions 16.

Blade holder 14 carries the rake portion 12 which includes a blade assembly generally indicated by the numeral 20. Blade assembly 20 includes a sawtooth blade portion, generally indicated by the numeral 21, and spaced guard blades generally indicated by the numeral 22.

Figure 5:
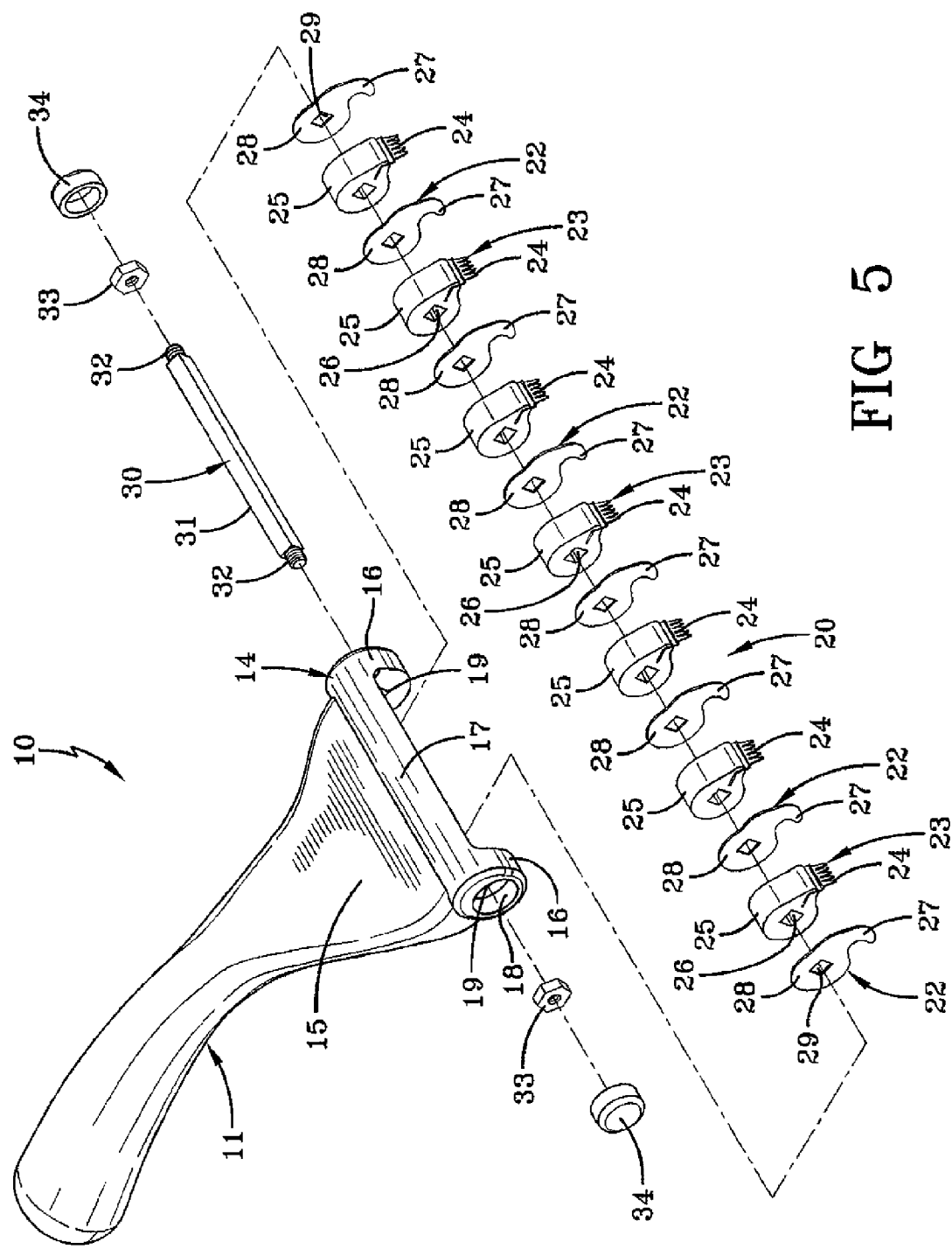
FIG. 5 is an exploded perspective view of the components of the pet tool.

The manner in which blade portion 21 is preferably formed, and the preferred configuration of blade guards 22, is best shown in FIG. 5. Blade portion 21 is shown as being formed of a plurality of blade segments, generally indicated by the numeral 23, each of which include a metallic sawtooth blade 24 having a plastic body 25 molded thereto. Body 25 has a non-circular, preferably square or hex, opening 26 formed therethrough. Blade guards 22 are preferably formed of a metallic material and include a hook portion 27 and a base portion 28. A non-circular, preferably square or hex, opening 29 extends through each base portion 28.

Rake portion 12 is assembled by threading blade segments 23 and blade guards 22 onto a shaft, generally indicated by the numeral 30, as it being positioned between end portions 16 of blade holder 14. As such, shaft 30 passes through an opening 19 in one end portion 16, has the blade segments 23 and blade guards 22 positioned thereon, and then shaft 30 is passed through the opening 19 in the other end portion 16. As shown, blade segments 23 and blade guards 22 alternate along shaft 30 such that there is a blade guard 22 on each side of each blade segment 23.

Shaft 30 includes a body 31 which is non-circular, preferably square or hexagonal in cross-section, and round threaded portions 32 at each end of body 31. Nuts 33 are received in the open end 18 of end portions 16 of blade holder 14 and are threaded onto shaft portions 32. A end cap 34 may be press fit into each open end 18 to close the ends of blade holder 14. Because of the non-circular configuration of opening 19, the corresponding configuration of shaft body 31, and the corresponding configurations of openings 26 and 29, blade segments 23 and blade guards 22 are fixed in proper alignment and may not rotate. As an alternative, the entire shaft may be maintained non-circular and held in place, by some suitable means, so that it will not rotate.

It should be noted that blade guards 22 extend farther outwardly forward of blade segments 23 and they also extend farther lower than blade segments 23. As such, the blade guards 22 maintain the blade segments 23 away from the skin of the animal while at the same time separating the hair of the animal so that the blade segments 23 may more easily grasp loose hair of the animal. The hook portions 27 of the blade guards 22 will also lift deeply embedded loose hair upwardly from the skin of the animal so that the blade segments 23 can grasp and remove it.

It should thus be evident that a pet deshedding tool as described herein accomplishes the objects of the invention and substantially improves the art.

What is claimed is:

1. An apparatus for removing loose hair from an animal comprising a handle, a blade holder carried by said handle, and a blade assembly carried by said blade holder, said blade assembly including a plurality of one piece blade segments, each having a plurality of teeth, said plurality of teeth extending in a direction parallel to a longitudinal axis of said blade assembly, and a plurality of blade guards, said blade segments and said blade guards alternating with each other to form said blade assembly.

2. The apparatus of claim 1 wherein each of said blade guards extends in a direction perpendicular to said longitudinal axis of said blade assembly.

3. The apparatus of claim 1 wherein said blade guards extend outwardly and downwardly from said blade holder farther than said blade segments.

4. The apparatus of claim 1 wherein said blade guards each include a base portion and a hook portion.

5. The apparatus of claim 4 wherein said blade segments each include a body portion carrying said blade portion, said blade portion having said plurality of teeth.

6. The apparatus of claim 5 wherein said hook portion extends farther outwardly and farther downwardly than said blade portion.

7. The apparatus of claim 5 wherein said base portion of each of said blade guards has a non-circular aperture therethrough, and said body portion of each said blade segment has a non-circular aperture therethrough, said blade assembly including a shaft extending through said non-circular apertures of said base portions and of said body portions, said shaft having a non-circular portion engaging said non-circular apertures of said base portions and of said body portions.

8. The apparatus of claim 7 wherein said blade holder includes spaced end portions which carry said shaft.

9. The apparatus of claim 8, said shaft having ends which are round and threaded, and said end portions each have an aperture therethrough, said ends of said shaft being received through said aperture of each of said end portions and being held in place by a nut received on each said threaded end.

10. The apparatus of claim 8, said end portions having open ends, the apparatus further comprising a cap to close each open end.

11. The apparatus of claim 1, said handle and said blade holder being made of a rigid plastic material and further comprising a plastic transition portion extending between said handle and said blade holder, at least a portion of said transition portion being formed of a softer plastic than said plastic of said handle and said blade holder.

12. An apparatus for removing loose hair from an animal comprising a handle, a blade holder carried by said handle, and a blade assembly carried by said blade holder, said blade assembly including a plurality of blade portions and blade guards alternating with said blade portions, said blade guards extending downwardly from said blade holder farther than said blade portions, wherein said blade portions are each one piece and have a plurality of teeth, said plurality of teeth extending in a direction parallel to a longitudinal axis of said blade assembly.

13. The apparatus of claim 12 wherein said blade guards extend outwardly from said blade holder farther than said blade portion.

14. The apparatus of claim 12 wherein said blade guards each include a base portion and a hook portion.

15. The apparatus of claim 14 wherein said blade portion includes a body portion.

16. The apparatus of claim 15 wherein said base portion of each of said blade guards has a non-circular aperture therethrough, and said body portion of said blade portion has a non-circular aperture therethrough, said blade assembly including a shaft extending through said non-circular apertures of said base portions and of said body portion, said shaft having a non-circular portion engaging said non-circular apertures of said base portions and of said body portion.

17. The apparatus of claim 16 wherein said blade holder includes spaced end portions which carry said shaft.

18. The apparatus of claim 17, said shaft having ends which are round and threaded, and said end portions each have an aperture therethrough, said ends of said shaft being received through said aperture of each of said end portions and being held in place by a nut received on each said threaded end.

19. The apparatus of claim 18, said end portions having open ends, the apparatus further comprising a cap to close each open end.

20. An apparatus for removing loose hair from an animal comprising a handle, a blade holder carried by said handle and having spaced open ends, a shaft carried between said ends, said shaft having threaded ends extending into said open ends, a nut in each open end received on said threaded ends of said shaft, a plurality of alternating blades and blade guards carried by said shaft, said blades each being one piece and having a plurality of teeth, said plurality of teeth extending in a direction parallel to a longitudinal direction of said shaft, and an end cap to close each said open end of said blade holder.

* * * * *